United States Patent
Müller

(10) Patent No.: US 7,175,199 B2
(45) Date of Patent: Feb. 13, 2007

(54) VEHICLE BODY FOR A PASSENGER CAR CONVERTIBLE AND A MODULAR UNIT

(75) Inventor: Hartwig Müller, Chemnitz (DE)

(73) Assignees: Blechformwerke Bernsbach AG, Bernsbacg (DE), part interest; ISE Innomotive Systems Europe GmbH, Bergneustadt (DE), part interest ( * ) Notice: Subject to any disclaimer, the term of this patent is extended or adjusted under 35 U.S.C. 154(b) by 355 days.

(21) Appl. No.: 10/468,762

(22) PCT Filed: Jun. 8, 2001

(86) PCT No.: PCT/EP01/06515

§ 371 (c)(1),
(2), (4) Date: Feb. 9, 2004

(87) PCT Pub. No.: WO02/066295

PCT Pub. Date: Aug. 29, 2002

(65) Prior Publication Data

US 2004/0130136 A1    Jul. 8, 2004

(30) Foreign Application Priority Data

Feb. 20, 2001 (DE) .......................... 201 03 001 U

(51) Int. Cl.
   *B60R 21/13* (2006.01)
(52) U.S. Cl. ..................................... 280/756
(58) Field of Classification Search ............. 280/756; B60R 21/13

See application file for complete search history.

(56) References Cited

U.S. PATENT DOCUMENTS 5,236,219 A    8/1993    Jambor et al.

(Continued)

FOREIGN PATENT DOCUMENTS

DE    198 26 672 A1    12/1999

(Continued)

OTHER PUBLICATIONS

International Search Report of PCT/EP01/06515, dated Nov. 14, 2001.

(Continued)

*Primary Examiner*—David R. Dunn
*Assistant Examiner*—Drew J. Brown
(74) *Attorney, Agent, or Firm*—Christie, Parker & Hale LLP

(57) ABSTRACT

A vehicle body (F) for a passenger car convertible, which has an integrated crosswise partition panel (T) behind the seat anchors (S), on which two retractable roll bars (B) are arranged next to one another, and which vehicle body includes on the back side of the partition panel (T) that is turned away from the seat anchors, exclusively in the upper area of the partition panel, a module carrier (M), which reinforces the partition panel, and which is oriented crosswise to the longitudinal direction of the vehicle, and which extends across the width of the interior of the vehicle body, and which is mounted on the partition panel, which positions the two roll bars (B) on the back side of the partition panel, so that the module carrier and the partition panel together form bar guides (G), whereby the module carrier (M), with the two roll bars (B), is one pre-mounted modular unit (E).

13 Claims, 1 Drawing Sheet

U.S. PATENT DOCUMENTS

| | | | |
|---|---|---|---|
| 5,626,361 A * | 5/1997 | Heiner | 280/756 |
| 6,443,517 B1 * | 9/2002 | Just et al. | 296/107.09 |
| 6,572,145 B1 * | 6/2003 | Guillez et al. | 280/756 |
| 6,988,744 B2 * | 1/2006 | Muller | 280/756 |
| 2003/0075911 A1 * | 4/2003 | Berges et al. | 280/756 |
| 2005/0082808 A1 * | 4/2005 | Wildig et al. | 280/756 |
| 2005/0140129 A1 * | 6/2005 | Miki et al. | 280/756 |
| 2005/0212277 A1 * | 9/2005 | Hamamoto et al. | 280/756 |

FOREIGN PATENT DOCUMENTS

| | | | |
|---|---|---|---|
| DE | 19910007 C1 * | 3/2000 | |
| DE | 199 05 578 A1 | 8/2000 | |
| DE | 10013376 C1 * | 6/2001 | |
| DE | 10316346 A1 * | 10/2004 | |
| DE | 10344446 B3 * | 2/2005 | |

OTHER PUBLICATIONS

International Preliminary Examination Report of PCT/EP01/06515, dated Mar. 24, 2003.

* cited by examiner

VEHICLE BODY FOR A PASSENGER CAR CONVERTIBLE AND A MODULAR UNIT

CROSS-REFERENCE TO RELATED APPLICATION

This application is a National Phase Patent Application of International Application Number PCT/EP01/06515, filed on Jun. 8 2001 which claims priority of German Patent Application Number 201 03 001.2, filed on Feb. 20, 2001.

BACKGROUND OF THE INVENTION (1) Field of the Invention

The invention relates to a vehicle body and more particularly to a modular unit for a vehicle body.

For a convertible Vehicle body with or without a permanently integrated partition panel, known from DE 41 00 506 A (U.S. Pat. No. 5,236,219 A), a frame closed on all sides is used for fitting the two roll bars; the roll bars, with their equipment components, are integrated in this frame. This modular unit is mounted to the connection points that are provided in the vehicle body, where the frame can be supported on the partition panel, if a permanently integrated partition panel is provided. The frame and the partition panel require a relatively large amount of room in the vehicle body and result in an unsuitably heavy weight.

(2) Description of Related Art

Two different approaches are known from DE 199 05 578 A. In one case, the two roll bars, with their equipment components, are pre-mounted in housing parts on a common panel. This panel, fitted with the roll bars, is then first welded into the vehicle body of the passenger car convertible as the partition panel. In the second case, the partition panel is a permanently welded-in constituent part of the vehicle body of the passenger car convertible. It is fitted with the two roll bars at a later time. Each roll bar is pre-assembled with a housing part and its equipment components, in one modular unit. Both modular units are attached to the partition panel separately, namely on the side of the partition panel that faces the seat anchors. Separate attachment of the modular units requires a very stable formation of the partition panel, with box section member structures, integrated at the top and bottom, that are space consuming and heavy. The modular units have multiple parts and are heavy. Installing them is costly. They require an undesirable amount of installation space behind the vehicle seats, which are built in later.

SUMMARY OF THE INVENTION

The object of the invention is to provide a vehicle body, of the type cited at the beginning, as well as a modular unit for equipping the vehicle body, that are both simple to install and that allow installation space and weight to be saved.

The module carrier, with two pre-mounted roll bars whose function can be verified, forms a single modular unit, which is light-weight and which can be installed in a single step. The module carrier that contains the two roll bars is a very dimensionally-stable structure, which provides decisive reinforcement for the partition panel when installed. As a result, the partition panel itself can be formed very simple. Installation of the modular unit on the back side of the partition panel is advantageous because this area is conveniently accessible. Space is saved behind the seat anchors because the modular unit does not require any installation space in front of the partition panel. Furthermore, important advantages for the appearance result, because the technical and static functions of the module carrier and the roll bars are concealed on the back side of the partition panel and placed out of the range of vision of the occupants, so that no covers, which increase the weight and take up space, are needed there.

Thanks to its high degree of inherent stability and its volume, important for the inherent stability, the module carrier is outstandingly usable for housing other equipment components for the vehicle body.

In view of the lowest possible weight and highest possible level of inherent stability, the module carrier is a U-section made of fibre-reinforced plastic, which consists of hot-pressformed glass-fibre prepregs, which are impregnated with thermoplastic plastics. Fibre-reinforced plastic offers the inestimable advantage of allowing practically unlimited design forms.

The roll bars and, if necessary, even the partition panel, should also be made of this fibre-reinforced plastic, because this allows considerable weight savings to be realized and because this material has excellent sliding surfaces for the movement of the roll bars.

When the module carrier is extended out over the side edges of the partition panel and bent there, especially usable installation space is created for additional equipment components. This formation also increases the inherent stability of the module carrier and, conversely, that of the partition panel and the vehicle body once more.

Because the partition panel is considerably reinforced by the module carrier, it can contain an opening, for example for loading long objects or for holding a ski bag.

Alternatively or additionally, the bottom side of the partition panel can even be distanced from the floor of the vehicle body, because the module carrier reinforces it to such an extent. This creates a long-cargo channel, such as can normally scarcely be realized on convertible vehicle bodies.

Although different types of joints can be used between the module carrier and the partition panel, a screwed joint offers the advantage of simple assembly and disassembly at any time.

Because most vehicle seat backs are curved, the partition panel should also be correspondingly curved in the direction of the height, as should the roll bars.

An important point of view for the modular unit is its complete preassembly outside of the vehicle body, with all equipment components, for both the roll bars and for additional vehicle functions, being built in and tested for their function outside the vehicle body. This simplifies and shortens the assembly process at the car manufacturer. If necessary, the assembly can even be carried out by the supplier.

The formation of the module carrier as a U-beam results in a high level of inherent stability with minimum weight, so that the partition panel in the vehicle body can be simply formed.

Roll bars made of fibre-reinforced plastic with lengthwise-running, formed ribbing can be formed to suit the load; they offer a high degree of freedom with regard to their shape and are extremely light. To manufacture the module carrier and/or the roll bars, glass fibre prepregs with thermoplastic plastic impregnation, preferably with a polypropylene basis, are used. These are very light weight and are formed with a view toward the load, and already inherently have the sliding or guide surfaces, with excellent surface quality, that are needed for adjusting each of the roll bars.

For the stability required in case of a crash, it is sufficient for the inherently dimensionally-stable module carrier to be lower than the partition panel in the direction of the height.

The forces are passed into the partition panel, but also directly into the vehicle body, with the module carrier creating the rigidity and loading capacity for the partition panel, which is not inherently suitable for such loads.

BRIEF DESCRIPTION OF THE DRAWING

The embodiments of the object of the invention are explained using the drawings.

DETAILED DESCRIPTION

Figure 1:
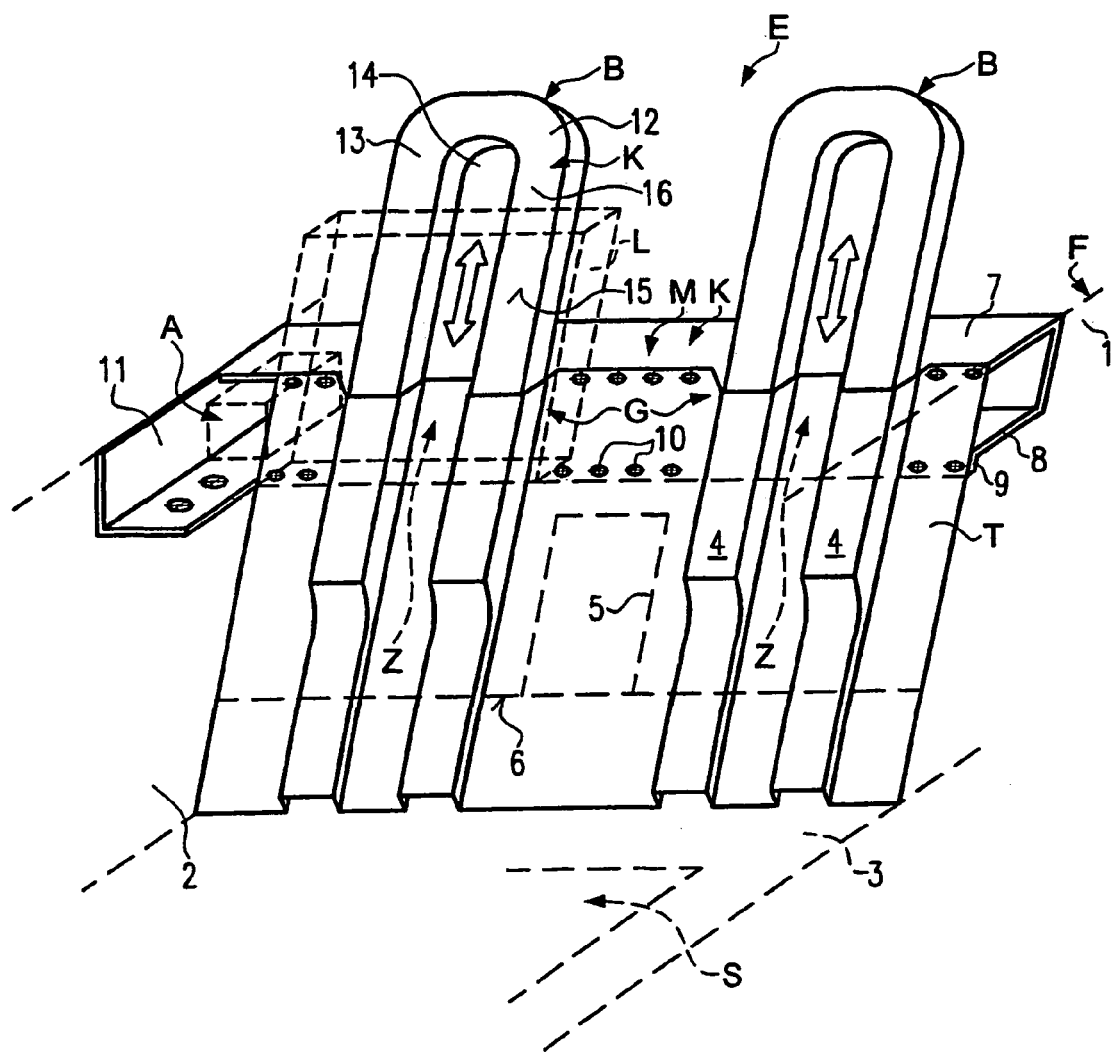
FIG. 1 shows a perspective view of a part of a vehicle body.

In FIG. 1, a part of a vehicle body F for a passenger car convertible can be recognized, seen in perspective, which has side panels 1, 2 and a floor structure 3. Between the side panels 1, 2 and connected, if necessary, with the floor 3, there is a partition panel T, which is oriented crosswise to the longitudinal direction of the vehicle, extending across the width of the interior of the vehicle body; this partition panel is permanently integrated into the vehicle body F, for example, by welding. The partition panel T can have shaping structures, such as ribbing or similar structures, which are not further stressed, that increase the rigidity and, in the case shown in the FIGURE, pairs of guide ribs 4, running upwards, for each of the two legs of a roll bar B. The partition panel T can be made of sheet metal. Because of additional weight savings and the high degree of freedom during shaping, a partition panel T made of endless-fibre-reinforced plastic, similar or equal to that of the module carrier M and/or the roll bars B, is advantageous.

The two roll bars B are adjustable up and down in the vehicle body in the normal way, for example, in order to be suddenly extended and locked in case of vehicle roll-over. Both roll bars B are integrated in one modular unit E, which consists of the two roll bars B and a dimensionally stable module carrier M, which runs crosswise in the vehicle. This modular unit E is attached to the back side of the partition panel T that faces away from the seat backs L, shown in dashed lines, of the vehicle seats arranged in seat anchors S of the vehicle body F.

Because the mounted module carrier M considerably increases the shape-related strength of the partition panel T and, if necessary, is also connected to the vehicle body F, it is definitely possible to leave a cutout 5 in the partition panel T, which allows long objects to be loaded, or to have the partition panel's lower edge, designated as 6, end at a distance from the floor 3.

Module carrier M is formed as a U-beam 7. Its U-legs 8 form mounting devices 9, which match the partition panel's mounting devices 10, which are accessible from the back side of partition panel T, so that the modular unit E can be built on to the back side of the partition panel, which is permanently integrated in the vehicle body F, for example, by being welded in. In the embodiment shown, screwed joints are provided between the module carrier M and partition panel T. It would, however, also be conceivable to select riveted joints, glued joints or welded joints, or a combination, here.

Module carrier M is a U-beam, integrally formed from endless-fibre-reinforced plastic K, with not further stressed guiding structures for the two roll bars B, supplementing the guide ribs 4 to form a complete bar guide. Here, fibre-reinforced plastic K means a material that is processed from several glass fibre prepregs in a hot-press-forming procedure, with the endless glass fibres forming a fabric in the prepregs that is integrated in a plastic matrix of a thermoplastic plastic, such as polypropylene.

In the right of FIG. 1, the end of the module carrier M more or less ends at the side edges of the partition panel. In the left of FIG. 1, the extension sections 11 are formed on to the module carrier M, which angularly reach around the side edge of the partition panel T, provide a C-shaped contour to the module carrier M and are formed to accept additional vehicle equipment components A, for example, supports for the top or fittings, seat belt modules or the like. The extension sections 11 can, for example, be connected to the vehicle body F.

The two roll bars B, which are identical to one another, are also made of endless fibre-reinforced plastic. Each roll bar B is at least one hot-press-formed shell 12, with reverse U-shaped external contour, two essentially parallel legs and length-wise oriented, formed ribs 13, 14, which are configured with an eye toward the load. The ribs 13, 14 form the guide or sliding surfaces 15 for the roll bar B in the guides formed by the partition panel T and the module carrier M.

Accessory components Z for the roll bars are also accommodated in the modular unit E of the module carrier M and the two roll bars B. This is driving equipment, which is not further stressed, such as spring energy accumulators, sensor analysis components for deploying the spring energy accumulators and locks for positioning the roll bars in the retracted position and for locking the roll bars in the extended position.

The modular unit E including the module carrier M with the two roll bars B and accessory parts Z and A can be completely prefabricated, and its function can be tested separately from the partition panel.

When assembling the vehicle body, the modular unit E is attached to the back side of the partition panel T from the back, whereby the partition panel T can be placed close behind the backs of the vehicle seats, according to the circumstances in the vehicle body. FIG. 1 indicates that the partition panel T has a curvature in the direction of the height, approximately conforming to the curvature of the vehicle seat backs L. The shells 12 of the roll bars B can also be curved correspondingly.

As an alternative, it is also conceivable to form the module carrier M as an extruded section or sheet metal edge profile, made of sheet steel or alloy. Because of the higher degree of freedom of fibre-reinforced plastic materials, however, this material should be given preference in the module carrier M.

The module carrier M can simultaneously function as a type of shelf panel in the vehicle body F, but it is removed from the direct line of vision of the vehicle occupants. For reasons of space and weight, the modular unit E requires only a portion of the height of the partition panel in the vehicle body F.

The invention claimed is:

1. A vehicle body for a passenger car convertible comprising a partition panel behind seat anchors, running crosswise to the longitudinal direction of the vehicle and permanently integrated in the vehicle body, which, in the upper area of the partition panel, is assigned a module carrier, which is oriented crosswise to the longitudinal direction of the vehicle and which reinforces the partition panel and which extends across the width of the interior of the vehicle body, and with two retractable roll bars in bar guides arranged on it next to one another, wherein the module carrier, with the two roll bars, is a
pre-mounted modular unit, separate from the partition panel, and is mounted on the back side of the partition panel turned away from the seat anchors, and wherein the module carrier positions the two roll bars on the back side of the partition panel and, with the partition panel, forms the bar guides.

2. The vehicle body in accordance with claim 1, wherein components for adjusting the bar, locking components and sensor components are integrated in the module carrier.

3. The vehicle body in accordance with claim 1, wherein the module carrier is a U-section made of a fibre-reinforced plastic, including hot-press-formed glass-fibre prepregs, impregnated with thermoplastic plastic.

4. The vehicle body in accordance with claim 1, wherein the two roll bars are formed from a fibre-reinforced plastic , consisting of hot-press-formed glass-fibre prepregs, impregnated with thermoplastic plastic.

5. The vehicle body in accordance with claim 1, wherein the module carrier is formed with sections, which extend over the side edges of the partition panel and are bent in the direction of the seat anchors, and wherein pre-mounted vehicle body equipment, such as supports for a top, seat belt modules or the like, are provided in the sections.

6. The vehicle body in accordance with claim 1, wherein a space is reserved between the bottom side of the partition panel and the floor of the vehicle body.

7. The vehicle body in accordance with claim 1, wherein the partition panel is curved in the direction of the height, with the concave side of the curvature facing the seat anchors.

8. The vehicle body in accordance with claim 1, wherein the partition panel is manufactured from a fibre-reinforced plastic, including hot-press-formed glass fibre prepregs, impregnated with thermoplastic plastic.

9. A modular unit for the vehicle body of a passenger car convertible, where the modular unit is attached to a partition panel that is permanently integrated in the vehicle body and that extends crosswise to the longitudinal direction of the vehicle, the modular unit comprising:
   a one-piece module carrier, which continues across the width of the interior of the vehicle body; and
   at least one, pre-mounted roll bar;
   wherein the at least one pre-mounted roll bar is pre-mounted in a module carrier front side, and
   wherein the module carrier front side has module carrier mounting devices that match partition panel mounting devices, which are accessible on a back side of the partition panel.

10. A modular unit for the vehicle body of a passenger car convertible, where the modular unit is attached to a partition panel that is permanently integrated in the vehicle body and that extends crosswise to the longitudinal direction of the vehicle, the modular unit comprising:
   a one-piece module carrier, which continues across the width of the interior of the vehicle body; and
   at least one pre-mounted roll bar,
   wherein the at least one pre-mounted roll bar is pre-mounted in a module carrier front side,
   wherein the module carrier front side has module carrier mounting devices that match partition panel mounting devices, which are accessible on a back side of the partition panel, and
   wherein additional vehicle body equipment components, such as supports for a top and/or seat belt modules, are pre-mounted in the module carrier in C-shaped, bent sections of the module carrier, at the side.

11. A modular unit for the vehicle body of a passenger car convertible, with at least one pre-mounted roll bar, where the modular unit is attached to a partition panel that is permanently integrated in the vehicle body and that extends crosswise to the longitudinal direction of the vehicle, the modular unit comprising:
   a one-piece module carrier, which continues across the width of the interior of the vehicle body; and
   at least one pre-mounted roll bar,
   wherein the at least one pre-mounted roll bar is pre-mounted in a module carrier front side,
   wherein the module carrier front side has module carrier mounting devices that match partition panel mounting devices, which are accessible on a back side of the partition panel, and
   wherein the module carrier is a U-beam made of fibre-reinforced plastic, whose U-legs have the mounting devices.

12. A modular unit for the vehicle body of a passenger car convertible, with at least one pre-mounted roll bar, where the modular unit is attached to a partition panel that is permanently integrated in the vehicle body and that extends crosswise to the longitudinal direction of the vehicle, the modular unit comprising:
   a one-piece module carrier, which continues across the width of the interior of the vehicle body; and
   at least one pre-mounted roll bar,
   wherein the at least one pre-mounted roll bar is pre-mounted in a module carrier front side,
   wherein the module carrier front side has module carrier mounting devices that match partition panel mounting devices, which are accessible on a back side of the partition panel, and
   wherein the roll bar is a press-formed shell of fibre-reinforced plastic, with a reverse U-shaped external contour and formed ribs oriented along the length of the U-bend.

13. A modular unit for the vehicle body of a passenger car convertible, with at least one pre-mounted roll bar, where the modular unit is attached to a partition panel that is permanently integrated in the vehicle body and that extends crosswise to the longitudinal direction of the vehicle, the modular unit comprising:
   a one-piece module carrier, which continues across the width of the interior of the vehicle body; and
   at least one pre-mounted roll bar,
   wherein the at least one pre-mounted roll bar is pre-mounted in a module carrier front side,
   wherein the module carrier front side has module carrier mounting devices that match partition panel mounting devices, which are accessible on a back side of the partition panel, and
   wherein the module carrier and the roll bars are both made of integrally press-formed glass-fibre prepregs with a polypropylene thermoplastic impregnation.

* * * * *